United States Patent [19]

Mikkola et al.

[11] 4,068,099

[45] Jan. 10, 1978

[54] METHOD OF AND APPARATUS FOR SWITCHING SERVICE INFORMATION UNITS IN A TDM SYSTEM

[75] Inventors: Osmo Arvid Ilmari Mikkola, Tyreso; Staffan Anders Emil Braugenhardt, Skarholmen, both of Sweden

[73] Assignee: Telefonaktiebolaget L M Ericsson, Stockholm, Sweden

[21] Appl. No.: 688,923

[22] Filed: May 21, 1976

[30] Foreign Application Priority Data

June 13, 1975 Sweden .............................. 7506811

[51] Int. Cl.² ........................ H04M 3/42; H04J 3/02
[52] U.S. Cl. .............................. 179/15 AT; 179/7 R; 179/18 B
[58] Field of Search .................. 179/6 C, 6 R, 6 TA, 179/1 SM, 18 B, 15 AT, 15 A, 7 R, 7.1 R, 7 MM, 8 R

[56] References Cited

U.S. PATENT DOCUMENTS

| | | | |
|---|---|---|---|
| 3,209,074 | 9/1965 | French | 179/1 SM |
| 3,214,520 | 10/1965 | Avakian et al. | 179/1 SM |
| 3,534,171 | 10/1970 | Shepard et al. | 179/6 C X |
| 3,969,587 | 7/1976 | Calcagno | 179/15 AT |

Primary Examiner—Thomas W. Brown
Attorney, Agent, or Firm—Hane, Roberts, Spiecens & Cohen

[57] ABSTRACT

Special services are switched to subscribers whose telephone sets are connectable to a time division multiplex (TDM) system. Each special service information unit is converted periodically into digital service words which are stored in a word memory and transferred from there during allotted time slots according to the time division multiplex system. A subscriber who calls one of the special services is allotted an idle time slot during which there is accessed an address associated with the called special service. The address activates the respective word memory for reading and transferring the stored special service information unit to the time division multiplex system. The same digital service word is read by means of the same address during different time slots as many times as there are subscribers who are switched to the associated special service.

9 Claims, 1 Drawing Figure

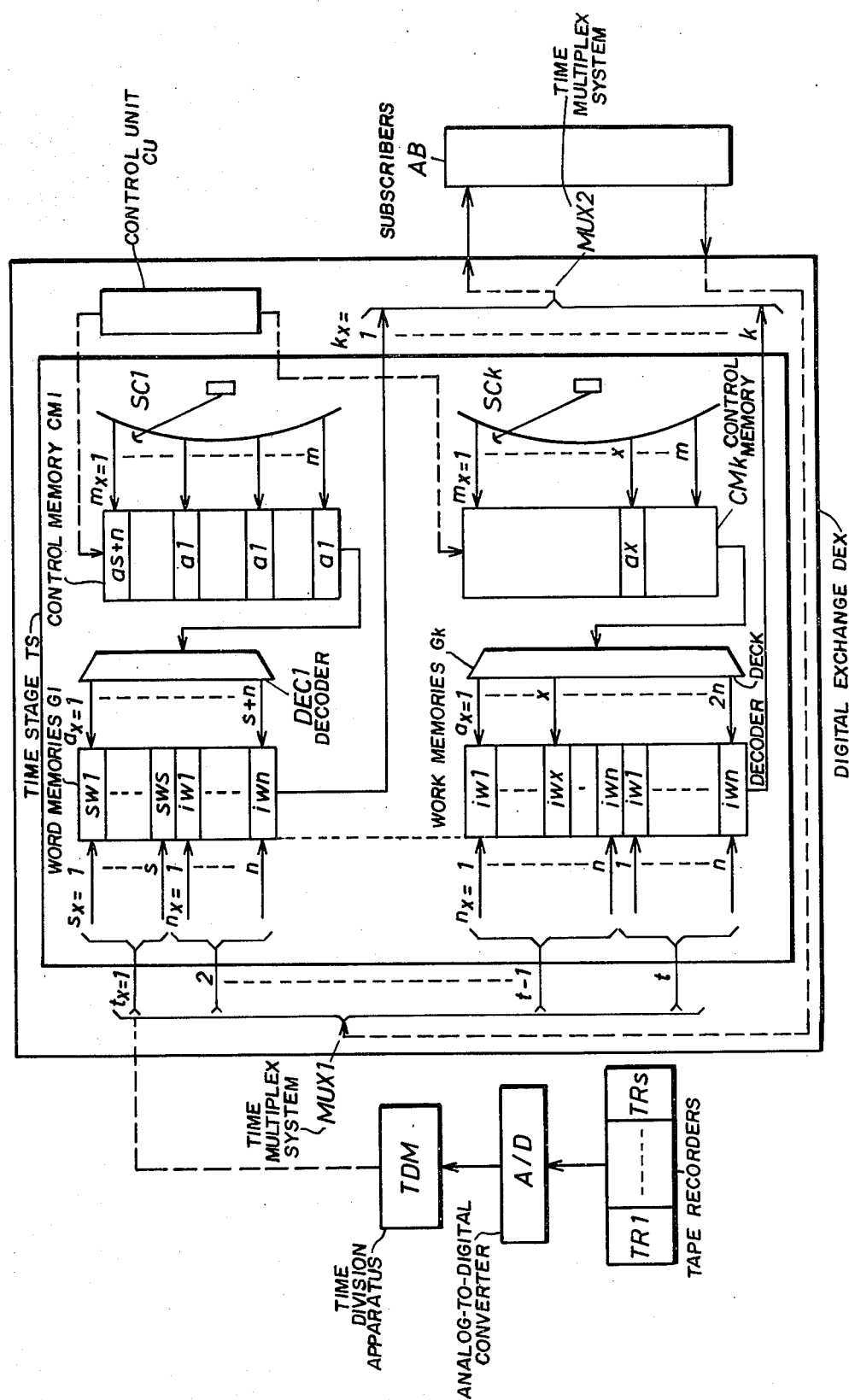

METHOD OF AND APPARATUS FOR SWITCHING SERVICE INFORMATION UNITS IN A TDM SYSTEM

The present invention relates to a method of switching at least one unit of service information referring to a special service to a number of subscribers whose telephone sets are connectable to a time division multiplex system in order to transfer during allotted time slots digital information words which previously have been stored periodically and by groups. Furthermore the invention relates to apparatus for executing the method.

Within a group of rural telephone networks and especially within a network of a town, the subscribers of the network are often offered a varying number of special services in the form of service information obtained from voice recording device. The voice recording devices are called by and connected to, respectively, the subscribers in a normal way and provide information such as news, weather reports and references due to a disturbance which affects the requested establishment of an arbitrary telephone connection. The voice recording devices or service machines are hereby considered as subscribers with special problems.

The most important problem when planning the network is that each service machine is connected simultaneously to a number of ordinary subscribers. For this reason, heretofore the respective exchange was provided with a special group selector stage which was arranged between the service machines and the other selector stages of the exchange, whereby the terminals of the special stage had generally been distributed with a certain proportion per service based on its average traffic load. However, an individual special service can be exposed to heavy demand, for example the news service during political crises. The demands do not exclusively lead to busy signals when the distribution lines allotted to the respective service are completely occupied, but create traffic chaos extending the entire network. In addition, the peak demands for one special service very rarely coincide with those of other special services and therefore the ordinary telephone traffic should bear a capacity decrease without increase of the risk for congestion.

In view of the above it is apparent there are large administration expenses if there is provided a conventional exchange which switches analog information signals, with an arrangement also intended for analog signals, by which the switching system between the service machines and the network varies dynamically according to need. In addition, in a stored program controlled exchange, the realization of such an arrangement demands extra hardware and extra software.

An object of the present invention is to produce automatically the mentioned dynamic switching of the service machines by means of a practically and economically insignificant expenditure. In particular there is used an extra equipment intended for digital signals which in principle is already present if the network is digital so called IST (Integrated Switching Transmission) system in which the telephone connections are established by means of digital exchanges as known, for example, by the U.S. Pat. No. 3,864,525.

The invention, the characteristics of which appear from the claims will hereinafter be explained with reference to the accompanying drawing which shows such parts of a IST-network which participate in switching a special service to the subscribers of the network.

Between the subscribers AB of the network and the voice recording devices, for example tape recorders $TR_1$ to $TR_s$, information converted according to a time division multiplex method is switched by a digital exchange DEX. In the drawing the network is assumed to include s special services the informative voice messages of which are transferred, according to the a well-known method by an analog-digital-converter AD, by time division multiplex arrangements TDM and by at least one link, continously to the exchange. A not shown variant of the service machine is a memory scanned by a time division multiplex arrangement, in which memory the respective service information is stored as a sequence of digital information words.

In a homogenous time division multiplex system, $n$ information words are transferred on each of $t$ transmission links, and each of the words is allotted a time slot within a frame, so the system contains $t \cdot n$ information channels, each of them defined through a link number $t_x$ and its associated channel number $n_x$. A combined time division multiplex system is obtained if its information channels are divided into groups $t_i \cdot n_i$, each of which refers to a homogenous system. A transfer of the channels of an incoming system $\Sigma t_i \cdot n_i$ to the channels of an outgoing system $\Sigma k_i \cdot m_i$ results in a change of the multiplex size without congestion, if $\Sigma t_i \cdot n_i = \Sigma k_i \cdot m_i$, with transfer between two systems being such that it is unalterably determined that an incoming channel defined by a link number $t_x$ and a channel number $n_x$ interchanges into an outgoing channel defined by link number $k_x$ and channel number $m_x$. If $\Sigma t_i \cdot n_i < \Sigma k_i \cdot m_i$ is valid for the systems, a redundancy is obtained for outgoing channels, which redundance usually is needed in order to avoid congestion in exchanges including several selector stages. By a switching between two systems is understood that the information in an arbitrary channel on an arbitrary incoming link is switched by at least one interchange in time and at least one interchange in space to an arbitrary channel on an arbitrary outgoing link. In general, a digital exchange comprises at least one time stage in order to carry out the interchanges in time and at least one space stage in order to carry out the interchanges in space. In a time stage the information words are moved freely from incoming to outgoing time slots, but it is unchangeably determined how imcoming links are connected to outgoing links. In a space stage the information words are moved freely from incoming to outgoing links but the time relations are unchangeably determined.

In order to switch, according to the invention, the service information of the service machines to calling subscribers one of the time stages TS of the exchange is used having a time multiplex system MUX1 wherein incoming information words are switched to an outgoing time multiplex system MUX2. The embodiment shown in the drawing assumes that the outgoing system MUX2 is homogeneous and comprises $m$ channels on each of $k$ links, so that an arbitrary outgoing channel is defined by a link number $1 \leq k_x \leq k$ and its associated channel number $1 \leq m_x \leq m$. The incoming system MUX1 is assumed to be combined and to comprise $t$ links with the link numbers $1 \leq t_x \leq t$. The link with the number $t_x = 1$ has $s$ channels with the numbers $1 \leq s_x \leq s$ and each of the other links with the numbers $2 \leq t_x \leq t$ has $n$ channels with the channel numbers $1 \leq n_x \leq n$.

The fixed or space relationships of the time stage TS are of that kind that the information words of two incoming links leave the stage on a determined allotted outgoing link, for example the links with the numbers $t_x = 1$ and $t_x = 2$ are assigned to the link with the number $k_x = 1$, so that $t = 2.k$. Furthermore, it is assumed that $s$ channels transfer each one of the $s$ special services and that $m = 2.n$ and that $s < n$.

Consequently, in the embodiment shown in the drawing, interchange in time is combined with a changing of the multiplex size and there is a redundancy concerning the outgoing link with the number $k_x = 1$. To introduce this redundancy is not absolutely necessary but, as it will appear later, the congestion risk is diminished in connection with the switching of the voice message services.

Other not-shown variants, in order to connect service machines to the time stage, associate each machine with its own one channel connection or form as well the incoming time multiplex system homogenously with $n$ channels on all the links, whereby the redundancy is kept because on the link used for the service machines only $s < n$ channels are occupied with constant numbers.

The time stage TS comprises word memories the writing inlets and the reading outlets of which are connected to the incoming and outgoing time multiplex system MUX1 and MUX2, respectively. Each of the incoming channels of the system MUX1 is allotted to one of the word memories which are arranged by groups. In the drawing there is shown that each of the service words $sw_1$ to $sw_s$ incoming on the link with the number $t_x = 1$ and the informattion words $iw_1$ to $iw_n$ incoming on the link with the number $t_x = 2$ are stored in a word memory, forming a memory group G1 which is allotted to the outgoing link with the number $k_x = 1$. The means for regularly and cyclically addressing the word memories to receive words for writing by means of timing pulses for the combined time multiplex division system MUX1 is not shown because it is accomplished by well-known techniques. Similarly, the well known means for avoiding the coincidence of writing and reading in the word memories is not shown.

Furthermore, the time stage TS comprises control memories $CM_1$ to $CM_k$ each of which being associated with an outgoing link to store addresses, in order to, by means of address decoders $DEC_1$ to $DEC_k$, access the reading of a word memory of the memory groups $G_1$ to $G_k$ associated with the respective outgoing link. Every control memory which, by means of one of the scanners $SC_1$ to $SC_k$ is scanned for reading by determined timing pulses belonging to the outgoing time multiplex division system MUX2 has a storage capacity of $m$ addresses corresponding to the number of outgoing time slots. Thus, an information word $iw_x$ accessed for reading by means of the address $a_x$ is transferred on the respective outgoing link during the time slot which is allotted to the channel with the number $m_x$ and, during which the address $a_x$ is read from the respective control memory. A control unit CU of the exchange carries out the writing of addresses in the control memories: the writing is based on switching orders received by calls according to well known techniques.

When a special service is called, for example the one associated with the service words $sw_1$ which are accessible by the address $a_1$ in the memory group $G_1$, the control unit CU selects an idle channel on a link with the number $k_x = 1$ associated with this group, for example the one with the number $m_x = m$, and writes the address in the respective location in the control memory $CM_1$. The same address $a_1$ is written in response to further calls for this service in an arbitrary idle location in the control memory $CM_1$. On condition that the word memories storing the service words are of the non-destructive read-out type, i.e. there is no erasure of the contents in connection with reading, the described embodiment gives the opportunity of switching one special service to a maximum of $m$ subscribers but, in that case, there will be a congestion for switching all the rest of the service words and the channels transferred on the link with the number $t_x = 2$. The above-introduced redundancy of the link with the number $k_x = 1$, i.e., set $n < m$, lessens the risk of congestion.

If it must be avoided that one special service blocks all the rest of the channels which use the same outgoing link, a logical arrangement is provided in the control unit which stops the respective address registrations in the control memory at a given maximum even though there may still be some idle locations.

As a conclusion some modifications are mentioned concerning the distribution of the service words in the outgoing time division multiplex system. One modification is that a memory group only consists of word memories storing service information, in an extreme case only one service word. Another modification is that several memory groups comprise word memories storing both service information and ordinary information words.

In all the modifications using memory groups in which only one word memory storing service information is included, the possibility of adapting the traffic of the special services in a dynamic distribution among themselves is lost. Nevertheless, a modification should be mentioned, according to which each of the memory groups comprise one word memory to store a service information which informs about a fault situation which has arisen due to, for example, a break down in the links incoming to the respective memory group. The control unit comprises in this case an address converter which upon such fault situation converts all called ordinary addresses to the address which accesses reading the service information from the memory group.

The hereby described method of switching special services is not limited to exchanges provided with IST-networks but is also applicable in a conventional analog network. In this case a separate time stage is arranged as an extra equipment with a memory group which consists of word memories for storing service information. The reading of the group is controlled by a control memory, a scanner and a control unit completely according to the above description. As further extra equipment, a digital-to-analog converter is needed, by which the link outgoing from the memory group is connected to analog selector stages of the exchange through as many analog distribution lines as there are time slots in the outgoing time division multiplex system.

We claim:

1. In a telecommunication system a method for switching at least one service information referring to a special service to a number of subscribers whose telephone sets are connectible to a time division multiplex system in order to transfer during allotted time slots digital words, including digital information words, which previously have been stored periodically and by groups, said method comprising the steps of converting the service information periodically into digital service words, the form of which corresponds to the form of said information words, storing the service words in the same way as the information words, allotting an idle one of said time slots to each of the subscriber who calls the special service, and accessing during said time slot an address by means of which a stored service word is read and transferred to said time division multiplex system.

2. The method according to claim 1 wherein a number of service words are included in the same digital word group.

3. The method according to claim 1 wherein at least one digital word group consists of only digital service words.

4. The method according to claim 1 wherein at least one service word is included in each of the digital word groups.

5. Apparatus for switching at least one service information referring to a special service to a number of subscribers whose telephone sets are connectible to a time stage in order to switch digital information words to ordered time slots in a time division multiplex system, the time stage including, within at least one word memory group, arrayed word memories, each of said word memories storing one incoming digital word, control memories arranged by groups, each of said control memories storing one address for activating one word memory, belonging to the respective group, to read and transfer the respective word to an outgoing link, and scanning means for scanning said control memories by timing pulses determined by the time division multiplex system, said apparatus comprising at least one service machine means for sending service words through at least one incoming link to the time stage, the format of the service words corresponding to the format of the information words which through outgoing links are switched to the subscribers, and a control means for writing in an idle location of the respective control memory group an address by means of which a service word is accessed each time the respective service machine is called by one of the subscribers.

6. The arrangement according to claim 5, wherein several word memories belonging to the same word memory group are arranged to store service words.

7. The arrangement according to claim 5 wherein at least one word memory group is arranged to store only service words.

8. The arrangement according to claim 5 wherein each word memory group includes at least one word memory to store one of the service words.

9. In a time division multiplex system wherein digital words are transferred in time slots, a plurality of subscriber telephone sets, a digital exchange interconnecting the subscriber telephone sets for telecommunication by means of digital information words transferred in assigned time slots, said digital having addressed digital word memories for storing digital words including the digital information words, and means for reading the memories in synchronism with the time slots, and at least one source of a unit of analog service information related to a special service demandable by the subscriber telephone sets, the method of switching the unit of service information to a number of the subscriber telephone sets demanding the unit of service information comprising the steps of periodically converting the unit of analog service information to digit service words having the same format as the digital information words, storing the digital service words in some of the addressed digital word memories, assigning an available time slot to each of the subscriber telephone sets demanding the unit of service information, assigning addresses of the addressed digital word memories storing the digital service words to the available time slots, and reading out the digital service words, for transfer to subscriber telephone sets from the digital word memories having the addresses associated with the assigned time slots.

* * * * *